Jan. 20, 1925. 1,523,821
J. McGAVACK
PROCESS AND APPARATUS FOR CONCENTRATING FLUIDS
Filed July 11, 1923 2 Sheets-Sheet 1
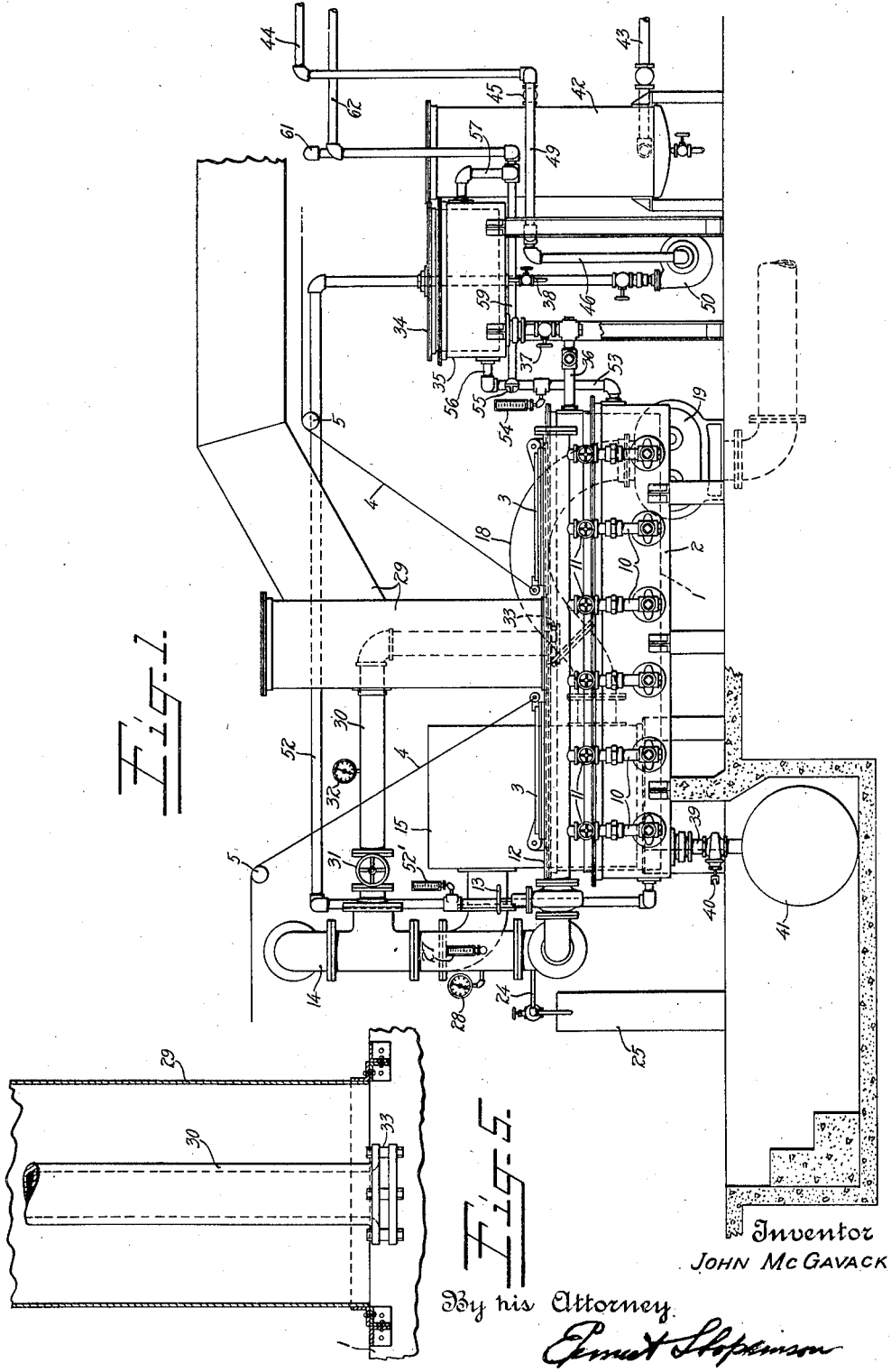
Inventor
JOHN McGAVACK
By his Attorney Jan. 20, 1925.
J. McGAVACK
1,523,821
PROCESS AND APPARATUS FOR CONCENTRATING FLUIDS
Filed July 11, 1923   2 Sheets-Sheet 2
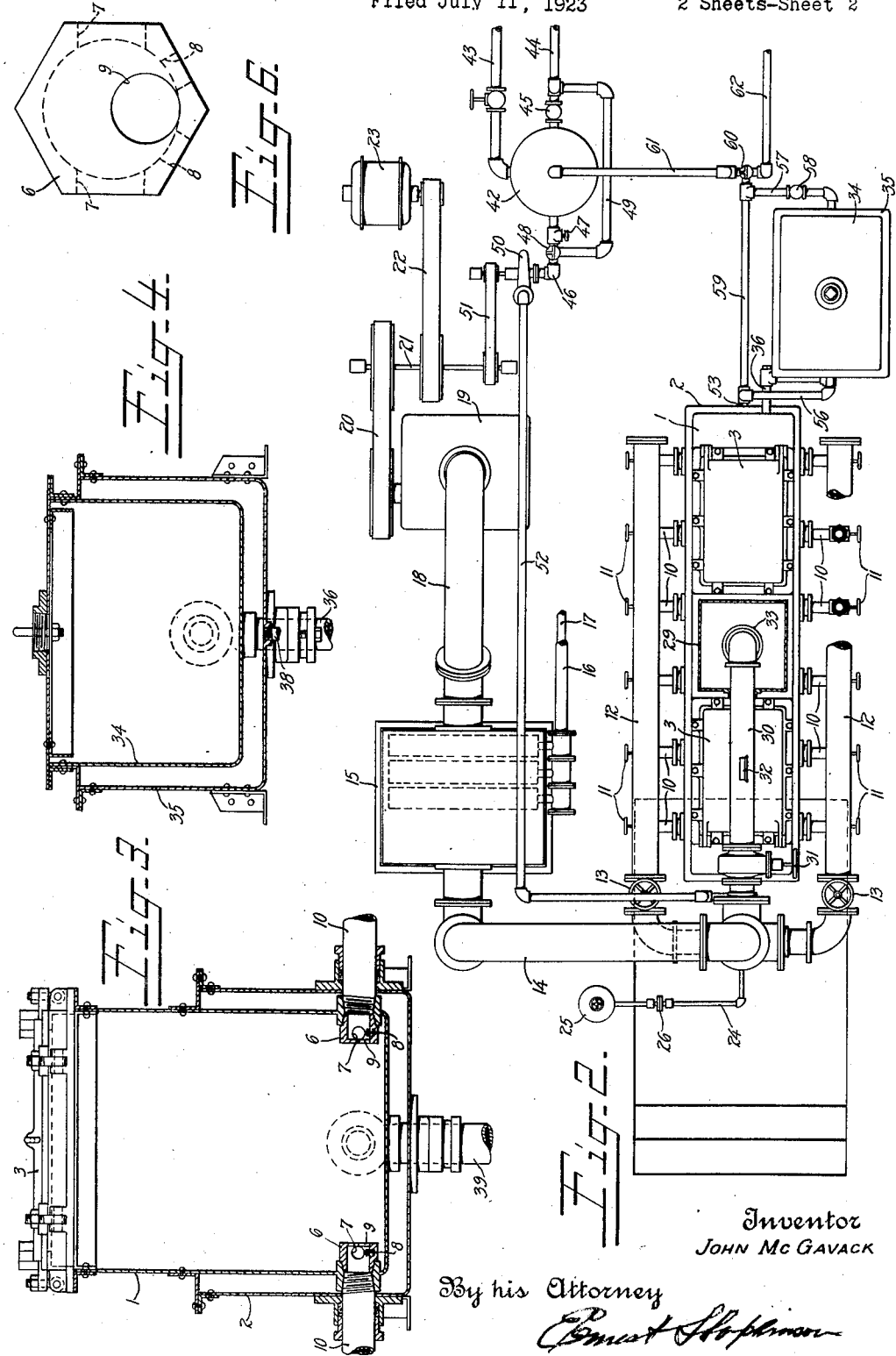
Inventor
JOHN McGAVACK
By his Attorney Patented Jan. 20, 1925.

1,523,821

UNITED STATES PATENT OFFICE.

JOHN McGAVACK, OF ELMHURST, NEW YORK, ASSIGNOR TO GENERAL RUBBER COMPANY, OF NEW YORK, N. Y., A CORPORATION OF NEW JERSEY.

PROCESS AND APPARATUS FOR CONCENTRATING FLUIDS.

Application filed July 11, 1923. Serial No. 650,801.

*To all whom it may concern:*

Be it known that I, JOHN McGAVACK, a citizen of the United States, residing at Elmhurst, L. I., county of Queens, and State of New York, have invented a certain new and useful Process and Apparatus for Concentrating Fluids, of which the following is a full, clear, and exact description.

This invention relates to a process and apparatus for concentrating fluids, more particularly as applied to the concentration of rubber and other latices.

Rubber latex as drawn from the trees varies somewhat in its percentage of rubber, due to different factors such as location, variety and age of the tree, and climatic and seasonal changes, but 33⅓% may be taken as an average for the rubber content. Such latex is about of the consistency of ordinary cream. The direct use of rubber latex for many purposes is becoming common, such as for coating and impregnating fabrics, etc. For many purposes, however, it is desirable to use latex of a greater concentration and thicker consistency, and to obtain it in this form it is therefore necessary to concentrate the latex as received in its natural form. A number of processes have been devised for accomplishing such concentration, the most widely used of which is heating in vacuo. A serious objection to the prior processes is the excessive foaming of the latex and also its tendency to undue coagulation even at moderate concentrations.

An object of my invention is to provide a simple and economic process for concentrating rubber and similar latices.

Another object is to provide for concentrating latex to a high degree without excessive coagulation.

Still another object is to provide a simple, efficient and entirely enclosed apparatus for carrying out the process.

For a detailed disclosure of the invention reference is had to the accompanying specification and drawings, in which latter:

Fig. 1 represents in side elevation an apparatus for carrying out the process,

Fig. 2 is a plan view thereof,

Fig. 3 is a transverse section through the concentrating tank,

Fig. 4 is a transverse section through the preheating tank,

Fig. 5 is a sectional detail of the foam preventing means, and

Fig. 6 is a front view of a nozzle used.

The apparatus for carrying out the process will first be described, and in this apparatus the numeral 1 represents a concentrating tank having disposed around it a heating jacket 2. In the present instance the tank is shown as of a relatively shallow and elongated rectangular form, but other forms of tank may be used. The top of the tank is closed and is provided with clean out openings closed by hinged doors 3, which latter may be raised by means of the cables 4 extending over the pulleys 5. Extending along the inner side walls of the tank adjacent the bottom are series of nozzles 6 for the discharge of a moisture absorbing medium into the latex, these nozzles, as shown in Fig. 6, being provided with opposed horizontal side outlets 7, inclined bottom outlets 8, and the forwardly directed outlet 9. However, any other suitable form of nozzle may be used as long as an even and wide spread distribution in the tank is secured. Each nozzle is connected to a supply pipe 10 provided with a controlling valve 11, which pipes lead upwardly into manifolds 12 disposed at each side of the tank. These manifolds are provided with controlling valves 13 and are connected to a main supply pipe 14 leading to the outlet of any suitable form of heater 15 for the moisture absorbing medium, which medium in the present instance is air. The heater as shown is heated by means of steam which is supplied through the pipe 16 and exhausted through the pipe 17, but any other heating means may be used. Air is supplied to the heater through the pipe 18 leading from any suitable form of blower 19, the latter being driven by a belt 20 from the shaft 21, which shaft in turn is driven by a belt 22 connected to a motor 23. It may be desirable at times to supply a coagulation preventative, such as ammonia, to the air, and for this purpose a supply pipe 24 leads from an ammonia tank 25 into the lower portion of the pipe 14, any suitable form of flow meter 26 being disposed in the pipe 24. The lower end of pipe 14 is also provided with a thermometer 27 and a pressure gauge 28. Leading from the tank 1, preferably from the middle of its top, is an exhaust pipe 29 for the moisture absorbing medium. Connected to the air pipe 14 is a pipe 30 provided with a controlling valve 31 and a pressure gauge 32, which pipe leads down within the exhaust pipe 29 and terminates in a nozzle 33 having a radially disposed outlet within the tank 1.

Adjacent the tank 1 is a latex preheating tank 34 provided with a heating jacket 35, and leading from the bottom of the tank 34 is a pipe 36 connected to the tank 1, which pipe is controlled by a valve 37. Leading from the bottom of the heating jacket 35 is a valve controlled drain pipe 38. Connected to the bottom of the concentrating tank 1 is an outlet pipe 39 controlled by a valve 40 and discharging into the drum 41 or any other suitable receptacle.

In the present instance the heating jackets of the tanks 1 and 34 are shown as heated by water, and for this purpose a water heater 42 is provided in which water may be heated by open steam supplied through the pipe 43. Cold water is supplied to the water heater through a pipe 44 which is provided with any suitable form of valve 45 for maintaining a constant level of water in the heater. Leading from the water heater is an outlet pipe 46 provided with a thermometer 47 and a 3-way valve 48, from the casing of which latter a by-pass 49 leads back to the cold water supply pipe 44. The pipe 46 is connected to the inlet of any suitable pump 50, which latter may be driven by the belt 51 from shaft 21. The outlet of pump 46 is connected to a pipe 52 leading into one side of the heating jacket 2, and disposed in said pipe is a thermometer 52'. Leading from the opposite side of the heating jacket 2 is an exhaust pipe 53 provided with a thermometer 54, which pipe is connected to a 3-way valve 55. Leading from one arm of this valve is a pipe 56 connected to one side of the heating jacket 35 of the preheating tank, while leading from the other side of jacket 35 is an exhaust pipe 57 in which is disposed a check valve 58. Also leading from the 3-way valve 55 is a by-pass 59 connected to the pipe 57 beyond check valve 58. Pipe 57 in turn leads into a 3-way valve 60, one arm of which is connected by a return pipe 61 to the water heater 42, while from the other arm of the 3-way valve 60 a waste pipe 62 leads.

In carrying out the process the preheating tank 34 and concentrating tank 1 are filled with latex, the pump 50 started and water at a temperature of 180–190° F. is circulated around the tanks until the latex in the concentrating tank has reached a temperature of approximately 160° F. The blower 19 is then started and the valves 13, 11 and 31 are opened. As the air is discharged into the latex through nozzles 6 foaming starts immediately, but this foaming is checked by the blast of air radially discharged through the outlet of nozzle 33 across the current of air rising from the latex and the foam is thereby prevented from passing up into the exhaust pipe 29. During the early part of the concentrating process a larger amount of air must be supplied to the foam preventing nozzle 33 but as the concentration increases the foaming gradually becomes less so that the valve 31 may be closed to a greater extent, and by the time the concentration has reached approximately 45% solids, this valve may be entirely closed. As the latex in tank 1 becomes concentrated its level falls and from time to time more latex may be supplied from the preheating tank to maintain its level substantially constant. Due to the evaporation the temperature in tank 1 tends to fall, but by maintaining the temperature in the preheating tank somewhat higher than in tank 1 the portions of fresh latex supplied therefrom to tank 1 will assist in keeping the temperature in the tank 1 at the desired point. During the early part of the process the temperature of the latex in tank 1 may be kept relatively high, but as the concentration proceeds and the tendency to coagulation becomes greater the temperature may be gradually lowered until at a concentration of from 60%–70% the temperature of the latex may be reduced as low as 80–90° F. While the temperatures given have been found satisfactory they may of course be varied, the only limitation being that excessive heating sufficient to cause undue coagulation be avoided. In the early stages of the process it will be unnecessary to add ammonia, but as before stated, when the tendency to coagulation becomes great at higher concentrations, ammonia may be supplied from tank 25 to the air in pipe 14. When the concentration has reached the desired degree the valve 40 may be opened and the concentrated latex emptied into the drum 41. If desired, however, the operation may be made substantially continuous by merely drawing off a portion of the latex into drum 41 and replacing it in tank 1 by a corresponding amount of latex drawn from the preheating tank 34. It will be seen that by means of the 3-way valve 48 the temperature of the water in pipe 46 may be reduced when desired by admixture with cold water supplied by the by-pass 49. The main purpose of this by-pass, however, is to quickly cool the concentrating tank and contents after a run is finished, which purpose may be accomplished by setting the valve 48 to entirely shut off the flow of hot water and admit only cold water from the by-pass 49. At this time it may be desirable to still maintain the heated condition of the latex in the preheating tank, for instance if another run is to immediately follow, and by properly setting the 3-way valves 55 and 60 the cold water issuing from the jacket 2 may be sent around the by-pass 59 and into the waste pipe 62, the check valve 58 at this time preventing any tendency of the cold water to circulate in pipe 57 and jacket 35. During the ordinary operation when both tanks 1 and 34 are being heated the valve 55 is set to shut off by-pass 59, and the valve 60 is set to shut off the waste pipe 62, and the hot water then circulates through the jackets 2 and 35 and thence back by way of pipe 61 into the water heater 42.

Latex is ordinarily preserved against coagulation by the addition of a small amount of ammonia, and as before stated more may be added in the later stages of concentration for the same purpose. When using an open evaporating system this ammonia escapes, which is objectionable for reasons of economy and the effect on operatives and adjacent material. By the use of my invention, however, all of the ammonia may be recovered by merely passing the exhaust in pipe 29 through suitable recovery apparatus.

While it is obvious that the moisture absorbing medium need not necessarily be heated it is preferable to do this in order to expedite the operation. The air should not be under too great pressure and a pressure of about three pounds has been found suitable. Due to the bubbling of the air or other moisture absorbing medium in widely distributed form through the latex, moisture is rapidly withdrawn therefrom without excessive heating of the latex and with a minimum of coagulum formed. The formation of foam is prevented or checked by the air discharged through nozzle 33, and it has been found practicable to coagulate latex to a percentage of 65% solids with great ease, and the concentration may even be carried to about 72% without the formation of an excessive amount of coagulum.

While a specific embodiment of the process and apparatus constituting the invention have been disclosed, it is obvious that numerous modifications will suggest themselves to those skilled in the art, and it is not desired to limit the invention otherwise than as set forth in the appended claims.

Having thus described my invention what I claim and desire to protect by Letters Patent is:

1. The process of concentrating latex or similar materials, which comprises passing a moisture absorbing medium intimately therethrough, and checking foaming thereof by the impact of fluid on the foam.

2. The process of concentrating latex or similar materials, which comprises heating the latex, passing a moisture absorbing medium intimately therethrough, and checking foaming thereof by the impact of fluid on the foam.

3. The process of concentrating latex or similar materials, which comprises passing a moisture absorbing medium in widely dispersed form therethrough in a closed vessel having an exhaust opening for said medium, and checking foaming by the direct impact of a portion of said medium on the foam.

4. The process of concentrating latex or similar materials, which comprises passing a moisture absorbing medium in widely dispersed form therethrough in a closed vessel having an exhaust opening for said medium and preventing escape of foam by directing a portion of said medium across said opening.

5. The process of concentrating latex or similar materials which comprises heating the latex, passing a moisture absorbing medium intimately therethrough, checking foaming thereof by the impact of a portion of said medium directly thereon, and reducing the temperature of the latex as the concentration increases.

6. The process of concentrating latex or similar materials, which comprises heating the latex, passing a heated moisture absorbing medium intimately therethrough, checking foaming thereof by the impact of a portion of said medium directly thereon, and gradually reducing the temperature of the latex after a predetermined concentration has been reached.

7. The process of concentration latex or similar materials, which comprises heating the latex, supplying a moisture absorbing medium, dividing the same and passing a portion thereof intimately through the latex, directing the remainder above the latex to check foaming thereof, and varying the division of said medium as the concentration increases.

8. The process of concentrating latex or similar materials, which comprises heating the latex, supplying a heated moisture absorbing medium, dividing the same and passing a portion thereof intimately through the latex, directing the remaining portion above the latex to check foaming thereof, and inversely varying said last portion as the concentration increases.

9. The process of concentrating latex or similar materials which comprises heating the latex, supplying a heated moisture absorbing medium, dividing the same and passing a portion thereof intimately through the latex, directing the remaining portion above the latex to check foaming thereof, inversely varying said last portion as the concentration increases, and reducing the temperature of the latex after a predetermined concentration thereof has been reached.

10. An apparatus for concentrating latex or similar materials, comprising a tank, means for heating the same, means for widely distributing a moisture absorbing medium within the latex therein, and additional means for distributing said medium above the latex in the tank and across that portion of the medium rising from the latex.

11. An apparatus for concentrating latex or similar materials, comprising a tank, means for heating the same, means adjacent the bottom of the tank for widely distributing a moisture absorbing medium therein, and additional means for radially discharging said medium in the upper part of the tank.

12. An apparatus for concentrating latex or similar materials, comprising a closed tank having a discharge passage leading from the upper part thereof, means for heating the tank, means for widely distributing a moisture absorbing medium within the latex in the tank, and means for preventing escape of foam into said discharge passage.

13. An apparatus for concentrating latex or similar materials, comprising a closed tank having a discharge passage for a moisture absorbing medium leading from the upper part thereof, a series of distributing nozzles for said medium disposed adjacent the tank bottom, and means disposed adjacent the inlet to said passage for breaking up any latex foam.

14. An apparatus for concentrating latex or similar materials comprising a closed tank having a discharge passage for a moisture absorbing medium leading from the upper part thereof, means for heating the tank, a branched supply pipe for said medium, a series of nozzles disposed within the lower part of the tank and connected to one branch of said pipe, means connected to another branch for projecting said medium across the inlet to said discharge passage, and means whereby the flow of said medium to said branches may be controlled.

Signed at New York, county and State of New York, this 27th day of June, 1923.

JOHN McGAVACK.